(12) United States Patent
Han et al.

(10) Patent No.: US 8,290,439 B2
(45) Date of Patent: Oct. 16, 2012

(54) SYSTEMS AND METHODS FOR CROSS-PLATFORM RADIO FREQUENCY INTERFERENCE MITIGATION

(75) Inventors: Kyungtae Han, Hillsboro, OR (US); Keith R. Tinsley, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 395 days.

(21) Appl. No.: 11/823,509

(22) Filed: Jun. 28, 2007

(65) Prior Publication Data

US 2009/0004989 A1  Jan. 1, 2009

(51) Int. Cl.
*H04B 1/00* (2006.01)
(52) U.S. Cl. ... 455/63.1; 455/69; 455/67.13; 455/67.11; 455/62; 455/114.2; 455/296; 455/71
(58) Field of Classification Search ............ 455/69, 455/67.13, 67.11, 63.1, 62, 114.2, 71, 296; 370/208; 375/260, 346, 371
See application file for complete search history.

(56) References Cited

U.S. PATENT DOCUMENTS

| | | | | |
|---|---|---|---|---|
| 5,706,256 A * | 1/1998 | Hood et al. | | 368/10 |
| 5,799,047 A * | 8/1998 | Dobrica | | 375/350 |
| 6,081,549 A * | 6/2000 | Shou et al. | | 375/152 |
| 6,278,864 B1 * | 8/2001 | Cummins et al. | | 455/73 |
| 6,516,183 B1 * | 2/2003 | Hellmark | | 455/78 |
| 6,801,586 B1 * | 10/2004 | Imamura | | 375/340 |
| 6,829,307 B1 * | 12/2004 | Hoo et al. | | 375/260 |
| 6,990,059 B1 * | 1/2006 | Anikhindi et al. | | 370/208 |
| 2001/0051530 A1 * | 12/2001 | Shiotsu et al. | | 455/522 |
| 2002/0136184 A1 * | 9/2002 | Liang et al. | | 370/338 |
| 2003/0128659 A1 * | 7/2003 | Hirsch et al. | | 370/208 |
| 2005/0002324 A1 * | 1/2005 | Sutivong et al. | | 370/208 |
| 2006/0083325 A1 * | 4/2006 | Schenk | | 375/260 |
| 2006/0133259 A1 * | 6/2006 | Lin et al. | | 370/208 |
| 2007/0183522 A1 * | 8/2007 | Garrett et al. | | 375/260 |
| 2009/0310586 A1 * | 12/2009 | Shatti | | 370/338 |

* cited by examiner

*Primary Examiner* — Matthew Anderson
*Assistant Examiner* — Ganiyu A Hanidu
(74) *Attorney, Agent, or Firm* — Schubert Law Group PLLC

(57) ABSTRACT

Embodiments include systems and methods for RFI mitigation in a wireless computing environment. In one embodiment, a platform determines RFI information of the platform by listening with a receiver of a transceiver of the platform when the transmitter of the transceiver is quiescent. The platform derives Frequency Domain Weights from the RFI information and transmits the Frequency Domain Weights to a Wireless Access Point (WAP). In the transmitter and receiver of the WAP, the Frequency Domain Weights are applied to signals received and to be transmitted.

15 Claims, 6 Drawing Sheets

SYSTEMS AND METHODS FOR CROSS-PLATFORM RADIO FREQUENCY INTERFERENCE MITIGATION

FIELD

The present invention is in the field of wireless communications in a wireless computing system. More particularly, the invention is in the field of radio interference mitigation in a wireless computing environment.

BACKGROUND

"Wireless computing" is a term that has come to describe wireless communications between computing devices or between a computer and peripheral devices such as printers. For example, many computers, including tower and laptop models, have a wireless communications card that comprises a transmitter and receiver connected to an antenna. Or alternatively, a Host Wire Adapter (HWA) is connected to the computer by a USB (Universal Serial Bus) cable. The HWA has an RF (Radio Frequency) transmitter and receiver capable of communicating data in a USB-cognizable format. Alternatively, a computer platform has a transceiver that enables it to communicate wirelessly to a Wireless Access Point. This enables the computer to communicate by RF transmission with a wireless network of computers and peripheral devices. The flexibility and mobility that wireless computing affords is a major reason for its commercial success.

Platforms unintentionally emit Radio Frequency Interference (RFI) from several sources such as LCD (liquid crystal displays), data buses, hard drives, and system clocks. The frequencies at which RFI is generated overlap with the frequencies of wireless communication systems. Therefore, platform RFI can degrade performance.

BRIEF DESCRIPTION OF THE DRAWINGS

Aspects of the invention will become apparent upon reading the following detailed description and upon reference to the accompanying drawings in which like references may indicate similar elements.

DETAILED DESCRIPTION OF EMBODIMENTS

The following is a detailed description of embodiments of the invention depicted in the accompanying drawings. The embodiments are in such detail as to clearly communicate the invention. However, the amount of detail offered is not intended to limit the anticipated variations of embodiments; but, on the contrary, the intention is to cover all modifications, equivalents, and alternatives falling within the spirit and scope of the present invention as defined by the appended claims. The detailed descriptions below are designed to make such embodiments obvious to a person of ordinary skill in the art.

Embodiments include systems and methods for RFI mitigation in a wireless computing environment. In one embodiment, a platform determines RFI information of the platform by listening with a receiver of a transceiver of the platform when the transmitter of the transceiver is quiescent. The platform derives Frequency Domain Weights from the RFI information and transmits the Frequency Domain Weights to a Wireless Access Point (WAP). In the transmitter and receiver of the WAP, the Frequency Domain Weights are applied to signals received and to be transmitted.

The wireless communication systems described herein are intended to represent any of a wide variety of wireless systems which may include without limitation, NFC (Near Field Communications), WPAN (Wireless Personal Area Network), WLAN (Wireless Local Area Network), WMAN (Wireless Metropolitan Area Network), WiMAX (Worldwide Interoperability for Microwave Access), 2.5-3G (Generation) cellular, 3G RAN (Radio Access Network), 4G, RFID (Radio Frequency Identification), etc.

Figure 1:
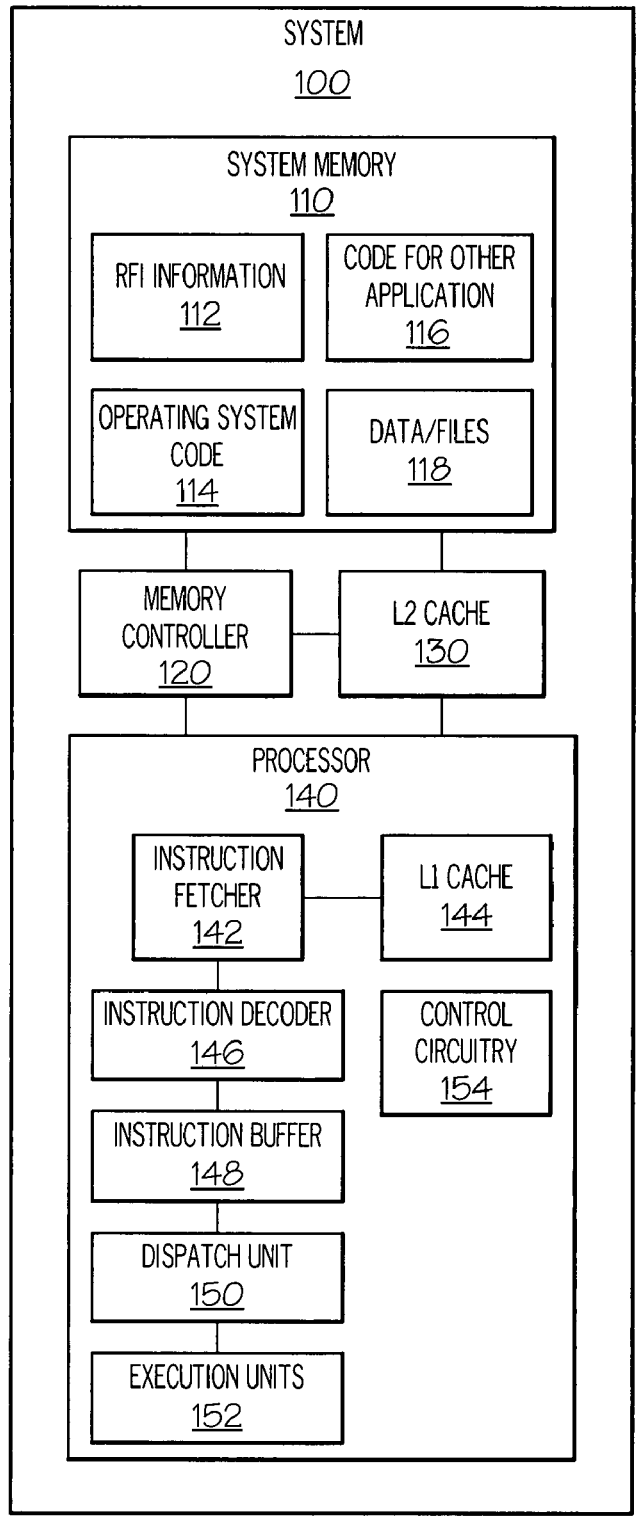
FIG. 1 depicts a processor of a computer platform capable of determining Frequency Domain Weights.
Figure 1A:
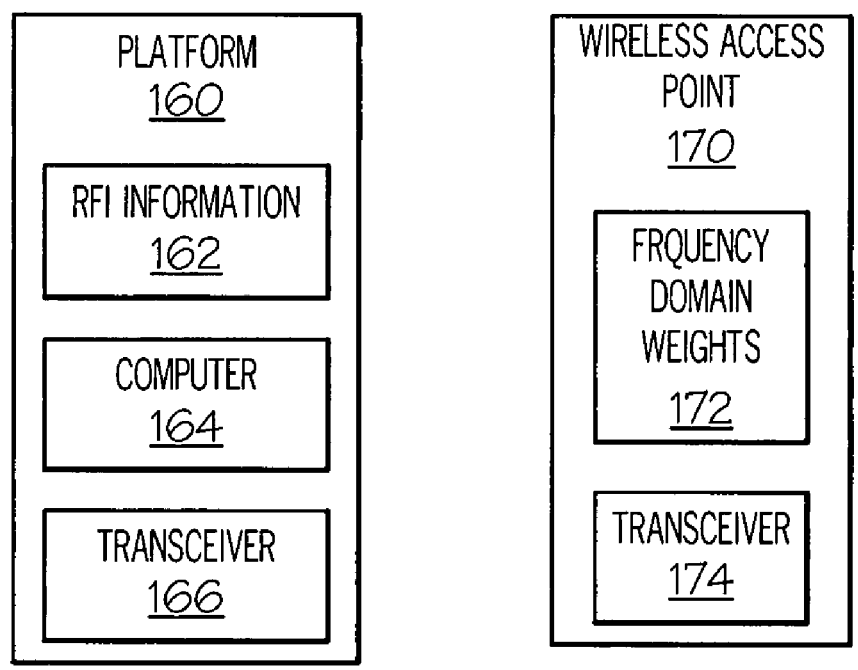
FIG. 1A depicts an embodiment of a computing platform is communication with a wireless access point adapted to mitigate RFI.

FIG. 1A shows a platform 160 and a wireless access point 170. Platform 160 and wireless access point 170 communicate wirelessly, that is, by over the air radio frequency transmission. Accordingly, platform 160 and wireless access point 170 each have a transceiver 166 and 174, respectively, for Radio Frequency (RF) communication. Platform 160 comprises a computer 164. Thus, platform 160 may be a desktop computer, a laptop computer, a work station, a server, etc. Wireless access point 170 facilitates communication between platform 160 and other devices such as other computers, servers, printers, scanners, etc. Thus, for example, wireless access point 170 may transmit and receive information from platform 160 and also transmit and receive information from the Internet or a network of other computers. In this way, platform 160 can communicate with a network, wirelessly. In some embodiments, wireless access point 170 may itself be a computer or server. Note, therefore, that in some embodiments, wireless access point 170 may comprise a computer.

Thus, in normal operation, platform 160, acting in response to user control, may need to transmit and receive information from the Internet by way of wireless access point 170. Data to be sent to the Internet would be transmitted by transceiver 166 of platform 160 to be received by transceiver 174 of wireless access point 170. Data to be received from the Internet would be transmitted by transceiver 174 of wireless access point 170 to be received by transceiver 166 of platform 160.

Platforms unintentionally emit radio frequency interference (RFI) from several sources such as LCD (liquid crystal displays), data buses, hard drives, and system clocks. The frequencies at which RFI is generated overlap with the frequencies of wireless communication systems. Therefore, platform RFI can degrade performance. Therefore, embodiments as described herein provide a method for mitigation of RFI. According to one method, RFI information is gathered by the platform and stored in RFI information memory 162 of platform 160. This can be done by utilizing the receiver of transceiver 166 to listen for RFI when no information is being transmitted by the transmitter of transceiver 166.

Once RFI information is determined and stored in memory 162, computer 164 of platform 160 will compute Frequency Domain Weights to compensate for platform RFI. These Frequency Domain Weights are sent to wireless access point 170 and stored in Frequency Domain Weight (FDW) memory 172 of wireless access point 170. As will be explained more fully below, the frequency domain weights are used to compensate for platform RFI. Thus, wireless access point 170 will use the frequency domain weights to de-emphasize RFI and emphasize data signals.

FIG. 1 shows a view of a computer 100 of a platform 160 to communicate with wireless devices. Computer 100 comprises a system memory 110, a memory controller 120, an L2 cache 130, and a processor 140. System memory 110 comprises a hard disk drive memory, Read-Only Memory (ROM), and Random Access Memory (RAM). System memory 110 stores Radio Frequency Interference (RFI) information 112, Operating System (OS) code 114, Basic Input-Output System (BIOS) code (not shown), and code for other application programs 116. System memory 110 also stores data and files 118. The RFI information 112, OS code 114, and applications code 116, are typically stored on a hard drive, whereas BIOS code is typically stored in ROM.

Memory controller 120 effectuates transfers of instructions and data from system memory 110 to L2 cache 130 and from L2 cache 130 to an L1 cache 144 of processor 140. Thus, data and instructions are transferred from a hard drive to L2 cache near the time when they will be needed for execution in processor 140. L2 cache 130 is fast memory located physically close to processor 140. Instructions may include load and store instructions, branch instructions, arithmetic logic instructions, floating point instructions, etc. L1 cache 144 is located in processor 140 and contains data and instructions received from L2 cache 130. Ideally, as the time approaches for a program instruction to be executed, the instruction is passed with its data, if any, first to the L2 cache, and then as execution time is near imminent, to the L1 cache.

In addition to on-chip level I cache 144, processor 140 also comprises an instruction fetcher 142, instruction decoder 146, instruction buffer 148, a dispatch unit 150, execution units 152 and control circuitry 154. Instruction fetcher 142 fetches instructions from memory. Instruction fetcher 142 maintains a program counter and fetches instructions from L1 cache 130. The program counter of instruction fetcher 142 comprises an address of a next instruction to be executed. Instruction fetcher 142 also performs pre-fetch operations. Thus, instruction fetcher 142 communicates with a memory controller 214 to initiate a transfer of instructions from the system memory 110, to instruction cache L2 130, and to L1 instruction cache 144. The place in the cache to where an instruction is transferred from system memory 110 is determined by an index obtained from the system memory address.

Instruction fetcher 142 retrieves instructions passed to instruction cache 144 and passes them to an instruction decoder 146. Instruction decoder 146 receives and decodes the instructions fetched by instruction fetcher 142. An instruction buffer 148 receives the decoded instructions from instruction decoder 146. Instruction buffer 148 comprises memory locations for a plurality of instructions. Instruction buffer 148 may reorder the order of execution of instructions received from instruction decoder 146. Instruction buffer 148 therefore comprises an instruction queue to provide an order in which instructions are sent to a dispatch unit 150.

Dispatch unit 150 dispatches instructions received from instruction buffer 148 to execution units 152. In a superscalar architecture, execution units 152 may comprise load/store units, integer Arithmetic/Logic Units, floating point Arithmetic/Logic Units, and Graphical Logic Units, all operating in parallel. Dispatch unit 150 therefore dispatches instructions to some or all of the executions units to execute the instructions simultaneously. Execution units 152 comprise stages to perform steps in the execution of instructions received from dispatch unit 150. Data processed by execution units 152 are storable in and accessible from integer register files and floating point register files not shown. Thus, instructions are executed sequentially and in parallel.

FIG. 1 also shows control circuitry 154 to perform a variety of functions that control the operation of processor 100. For example, an operation controller within control circuitry 154 interprets the OPCode contained in an instruction and directs the appropriate execution unit to perform the indicated operation. Also, control circuitry 154 may comprise a branch redirect unit to redirect instruction fetcher 142 when a branch is determined to have been mispredicted. Control circuitry 154 may further comprise a flush controller to flush instructions younger than a mispredicted branch instruction. Computer 100 further comprises other components and systems not shown in FIG. 1, including, RAM, peripheral drivers, a system monitor, a keyboard, flexible diskette drives, removable non-volatile media drives, CD and DVD drives, a pointing device such as a mouse, etc. Computer 100 may be a personal computer, a workstation, a server, a mainframe computer, a notebook or laptop computer, etc.

In one embodiment, computer 100 executes software to compute a Fourier Transform of RFI information to determine a set of Frequency Domain Weights for RFI mitigation. These Frequency Domain Weights are transferred to a Wireless Access Point (WAP) to enable the WAP to compensate for the RFI of the platform.

Figure 2:
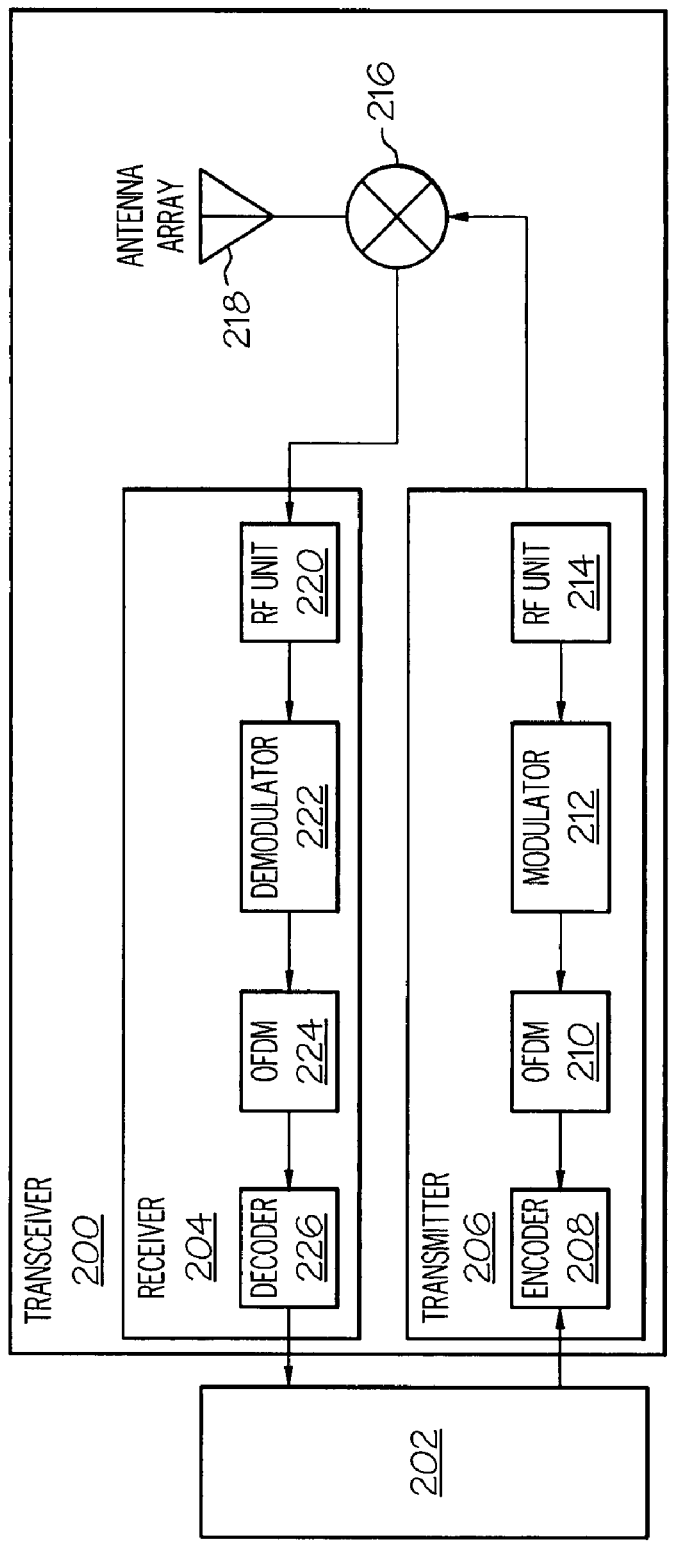
FIG. 2 depicts an Orthogonal Frequency Division Multiplexer (OFDM) transceiver.

FIG. 2 shows a general flow of example signal processing in a transceiver 200. Transceiver 200 comprises a receiver 204 and a transmitter 206. Transmitter 206 may comprise one or more of an encoder 208, an Orthogonal Frequency Division Multiplexer (OFDM) 210, a modulator 212 and an RF (Radio Frequency) unit 214. Receiver 204 may comprise one or more of an RF unit 220, a demodulator 222, an OFDM unit 224 and a decoder 226. Each of these components of transceiver 200 and their functions will now be described.

Encoder 208 of transmitter 206 receives data destined for transmission from a processor core 202. Processor core 202 may present data to transceiver 200 in blocks such as bytes of data. In particular, processor core 202 comprises some of the components shown in FIG. 1 as described above. Processor core can receive Radio Frequency Interference (RFI) Information to determine Frequency Domain Weights to be transferred to a wireless access point by way of a transceiver. Encoder 208 encodes the data using any one of a number of algorithms now known or to be developed. Coding may be performed to decrease the average number of bits that must be sent to transfer each symbol of information to be transmitted. Or coding may be performed to decrease a probability of error in symbol detection at the receiver. Thus, an encoder may introduce redundancy to the data stream. Adding redundancy increases the channel bandwidth required to transmit the information, but results in less error, and enables the signal to be transmitted at lower power. Encoding may also comprise encryption for security. One type of encoding is block encoding. Another type of encoding is linear convolutional encoding. Thus, different embodiments may implement different encoding algorithms.

The output of encoder 208 is fed to an Orthogonal Frequency Division Multiplexer (OFDM) 210. OFDM 210 impresses the encoded data from encoder 208 onto a plurality of orthogonal sub-carriers. A serial bit stream is converted to blocks of n bits of data in parallel by a serial-to-parallel converter. Then, an inverse discrete Fourier transform (DFT), e.g. a Fast Fourier Transform (FFT), is performed on the data. This impresses the data onto multiple orthogonal sub-carriers. Then, the data may be converted to a serial stream of data of different channels by a parallel to serial converter. As will be explained more fully below, the OFDM unit comprises a Frequency Domain Weights unit to apply Frequency Domain Weights to a frequency domain representation of a transmit or receive signal to achieve RFI mitigation.

Modulator 212 of transmitter 206 receives data from OFDM unit 210. A purpose of modulator 212 is to transform each block of binary data received from OFDM 210 into a unique continuous-time waveform that can be transmitted by an antenna upon up-conversion and amplification. Modulator 212 impresses the received data blocks onto a sinusoid of a selected frequency. More specifically, modulator 212 maps the data blocks into a corresponding set of discrete amplitudes of the sinusoid, or a set of discrete phases of the sinusoid, or a set of discrete frequency shifts relative to the frequency of the sinusoid. The output of modulator 212 is a band pass signal.

In one embodiment, modulator 212 maps a sequence of binary digits into a set of discrete amplitudes of a carrier frequency. This is called Pulse Amplitude Modulation (PAM). Quadrature Amplitude Modulation (QAM) is attained by impressing two separate k-bit symbols from the information sequence onto two quadrature frequencies, cos(2πft) and sin(2πft). In another embodiment, modulator 212 maps the blocks of data received from OFDM 210 into a set of discrete phases of the carrier to produce a Phase-Shift Keyed (PSK) signal. An N-phase PSK signal is generated by mapping blocks of k=$\log_2$ N binary digits of an input sequence into one of N corresponding phases θ=2π(n−1)/n for n a positive integer less than or equal to N. A resulting equivalent low pass signal may be represented as $$u(t) = \sum_{n=0}^{\infty} e^{j\theta_n} g(t - nT)$$

where g(t-nT) is a basic pulse whose shape may be optimized to increase the probability of accurate detection at a receiver by, for example, reducing inter-symbol interference. Inter-symbol interference results when the channel distorts the pulses. When this occurs adjacent pulses are smeared to the point that individual pulses are difficult to distinguish. A pulse shape may therefore be selected to reduce the probability of symbol misdetection due to inter-symbol interference.

In yet another embodiment, modulator 212 maps the blocks of data from an information sequence received from OFDM 210 into a set of discrete frequency shifts to produce a Frequency-Shift-Keyed (FSK) signal. A resulting equivalent low pass signal may be represented as:

$$u(t) = \sum_{n=0}^{\infty} \exp(j\pi \Delta f t I_n) g(t - nT)$$

where $I_n$ is an odd integer up to N-1 and $\Delta f$ is a unit of frequency shift. Thus, in an FSK signal, each symbol of an information sequence is mapped into one of N frequency shifts. Persons of skill in the art will recognize that the mathematical equations discussed herein are illustrative, and that different mathematical forms may be used to represent the pertinent signals. Also, other forms of modulation that may be implemented in modulator 212 are known in the art.

The output of modulator 212 is fed to RF unit 214 which up-converts the signal to a higher carrying frequency. Or, modulation may be performed integrally with up-conversion. Shifting the signal to a much higher frequency before transmission enables use of an antenna array of practical dimensions. That is, the higher the transmission frequency, the smaller the antenna can be. Thus, an up-converter multiplies the modulated waveform by a sinusoid to obtain a signal with a carrier frequency that is the sum of the central frequency of the waveform and the frequency of the sinusoid. The operation is based on the trigonometric identity, $$\sin A \cos B = \frac{1}{2}[\sin(A+B) + \sin(A-B)].$$

The signal at the sum frequency (A+B) is passed and the signal at the difference frequency (A−B) is filtered out. Thus, a band pass filter is provided to ideally filter out all but the information to be transmitted, centered at the carrier (sum) frequency. RF unit 214 also provides amplification of the RF signal.

FIG. 2 also shows diplexers 216 connected to antenna 218. Thus, in this embodiment, a single antenna or antenna array is used for both transmission and reception. When transmitting, the signal passes through diplexers 216 and drives the antenna with the up-converted information-bearing signals. During transmission, the diplexers prevent the signals to be transmitted from entering receiver 204. When receiving, information bearing signals received by the antenna array pass through diplexers 216 to deliver the signal from the antenna array to receiver 204. The diplexer then prevents the received signals from entering transmitter 206. Thus, diplexers 216 operate as switches to alternately connect the antenna array elements to the receiver and the transmitter.

Antenna 218 radiates the information bearing signals into a time-varying, spatial distribution of electromagnetic energy that can be received by an antenna of a receiver. The receiver can then extract the information of the received signal. An array of antenna elements can produce multiple spatial channels that can be steered to optimize system performance. Reciprocally, multiple spatial channels in the radiation pattern at a receive antenna can be separated into different spatial channels. Thus, a radiation pattern of antenna array 218 may be highly selective. Antennas 218 may be implemented using existing printed circuit board metallization technology. Microstrips, striplines, slotlines, and patches, for example, are all candidates for antennas 218.

FIG. 2 also shows an embodiment of a receiver 204 for receiving, demodulating, and decoding information bearing signals. The received signals are fed from antenna elements 218 to an RF unit 220. RF unit 220 amplifies, filters, and down converts the received signal. Demodulator 222 demodulates the received signal. Demodulation is the process of extracting information content from the received signal to produce an un-demodulated information signal. The method of demodulation depends on the method by which the information is modulated onto the received carrier signal. Thus, for example, if the modulation is PSK, demodulation involves phase detection to convert phase information to a binary sequence. Demodulation provides to OFDM unit 224 a sequence of bits of information.

The output of demodulator 222 is fed to Orthogonal Frequency Division Multiplexer (OFDM) 224. OFDM 224 extracts signal information from the plurality of subcarriers onto which information bearing signals are modulated. First, a sequential stream of data is converted to parallel. Then, a discrete Fourier transform (DFT) such as, e.g., a Fast Fourier Transform (FFT) is performed to extract the signal information from the sub-carriers. In one embodiment, demodulation is performed in parallel on the output data of the FFT. In another embodiment, demodulation is performed separately by a separate demodulator 222. Accordingly, in one embodiment, the OFDM processed signals are converted to a serial data stream and input to decoder 226. Decoder 226 decodes the received binary data blocks from demodulator 224 and transmits the decoded information to processor core 202.

Persons of skill in the art will recognize that a transceiver will comprise numerous additional functions not shown in FIG. 2. Thus, a transceiver will comprise a Direct Random Access Memory (DRAM), a reference oscillator, filtering circuitry, synchronization circuitry, possibly multiple frequency conversion stages and multiple amplification stages, etc. Further, some of the functions shown in FIG. 2 may be integrated. Thus, FIG. 2 shows a general flow of signal processing in a transceiver. Actual implementations may vary. For example, some embodiments may apply DBF (Digital Beam Forming).

Figure 3:
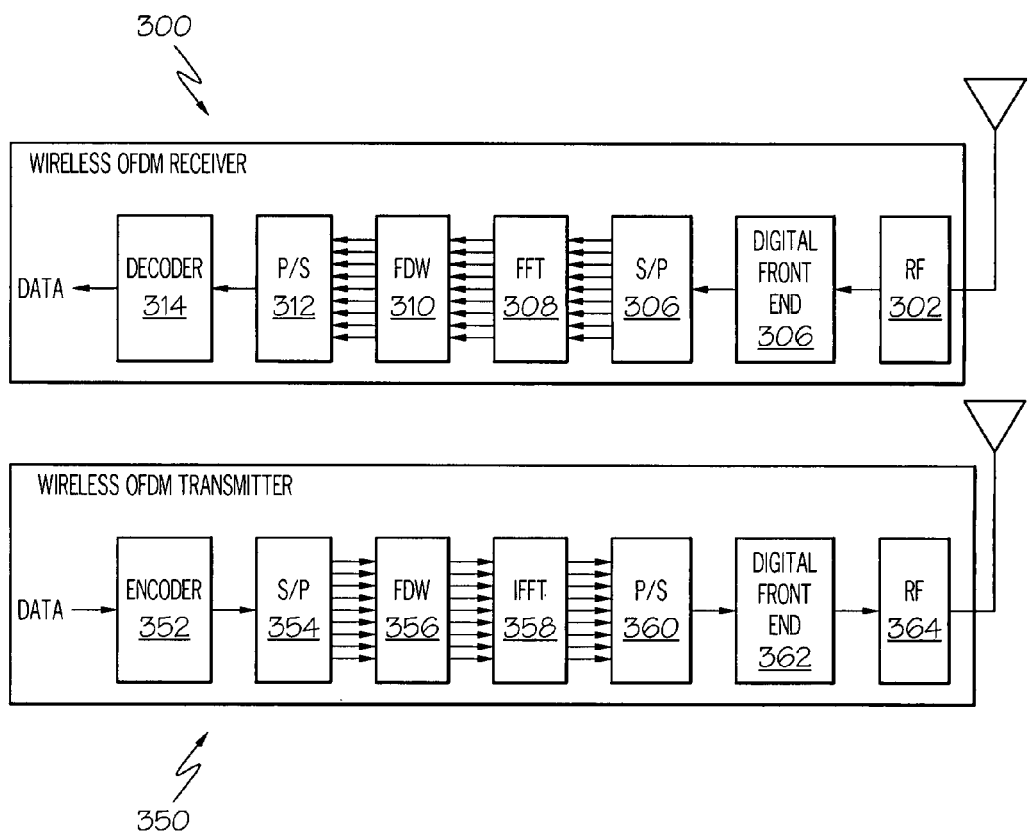
FIG. 3 depicts a more detailed view of the OFDM transceiver.

FIG. 3 shows a more particularized view of an OFDM receiver 300 and transmitter 350. FIG. 3 shows components for implementing OFDM according to embodiments described herein. In the transmitter 350, encoder 352 functions as described above for encoder 208. The information signal from encoder 352 may be modulated before or after the OFDM process. The OFDM process starts with serial to parallel conversion of the information signal by S/P 354. A Frequency Domain Weight unit 356 then multiplies the parallelized information signal by frequency domain weights to compensate the signal for RFI. IFFT unit 358 performs an Inverse Fast Fourier Transform upon the signal to convert the signal to the time domain. The OFDM process is completed by converting the parallel signal to serial by P/S unit 360. A digital front end unit 362 then processes the serialized time domain signal to modulate the signal for transmission. A Radio Frequency (RF) unit 364 then up-converts the signal and amplifies it just prior to transmission.

In the receiver 300, an RF unit 302 amplifies and down-converts the received RF signal. A digital front end 304 demodulates the received signal. A Serial to Parallel converter (S/P) 306 converts the signal to parallel. A Fast Fourier Transform (FFT) unit 308 transforms the signal to the frequency domain. A Frequency Domain Weight (FDW) unit 310 compensates the signal for RFI. The P/S unit 312 then converts the parallel signal to serial and the decoder 314 decodes the signal.

Thus, RFI of the platform is measured and a set of compensating Frequency Domain Weights (FDW) are determined to compensate for the RFI. The FDW are then transferred to a wireless access point. Within the wireless access point, a signal to be transmitted is RFI compensated using the Frequency Domain Weights. A signal the wireless access point receives from the platform is also compensated within the wireless access point using the Frequency Domain Weights.

So some embodiments comprise a wireless access point employing compensation for Radio Frequency Interference (RFI) of a platform. These embodiments comprise a Frequency Domain Weight unit to apply Frequency Domain Weights to a signal; wherein the Frequency Domain Weights are derived from RFI information of the platform. Embodiments further comprise a Fourier Transform unit to Fourier-transform a signal of the wireless access point so that the Frequency Domain Weights can be applied to a Frequency Domain representation of the signal. Embodiments further comprise an encoder to encode signal information prior to application of the Frequency Domain Weights. Embodiments further comprise a modulator to modulate a signal to which the Frequency Domain Weights and Fourier Transform has been applied. In the receiver, embodiments comprise a demodulator to demodulate a received signal prior to Fourier Transformation and application of the Frequency Domain Weights. Also, the receiver comprises a decoder to decode a signal to which the Frequency Domain Weights and a Fourier Transform have been applied. In one embodiment, the wireless access point receives the Frequency Domain Weights from the platform, whereas in another embodiment, the wireless access point receives the RFI information and computes there from the Frequency Domain Weights.

Figure 4:
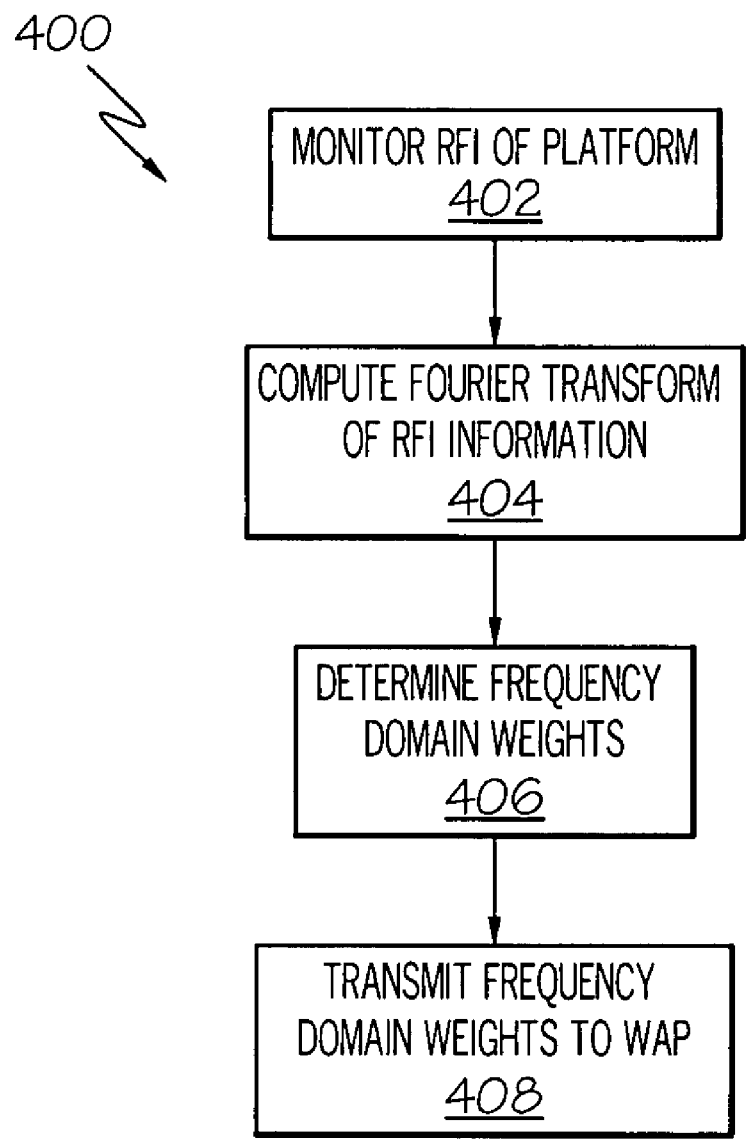
FIG. 4 depicts a flow chart of an embodiment for determining Frequency Domain Weights.

FIG. 4 shows a flow chart 400 of an embodiment for computing and transmitting frequency domain weights for RFI compensation. While the transmitter of the transceiver of the platform is quiescent, the receiver of the transceiver of the platform listens and accumulates RFI information over time (element 402). A computer of the platform performs a Fourier transform upon the accumulated RFI information measured by the receiver (element 404). From the Fourier transform, the computer of the platform determines a set of Frequency Domain Weights (element 406). These Frequency Domain Weights are transmitted to the Wireless Access Point (WAP) where they are stored and used for RFI compensation (element 408). Note that in an alternative embodiment, the platform may transmit the RFI information itself to the WAP, with the WAP able to compute the Frequency Domain Weights from the received RFI information.

Figure 5:
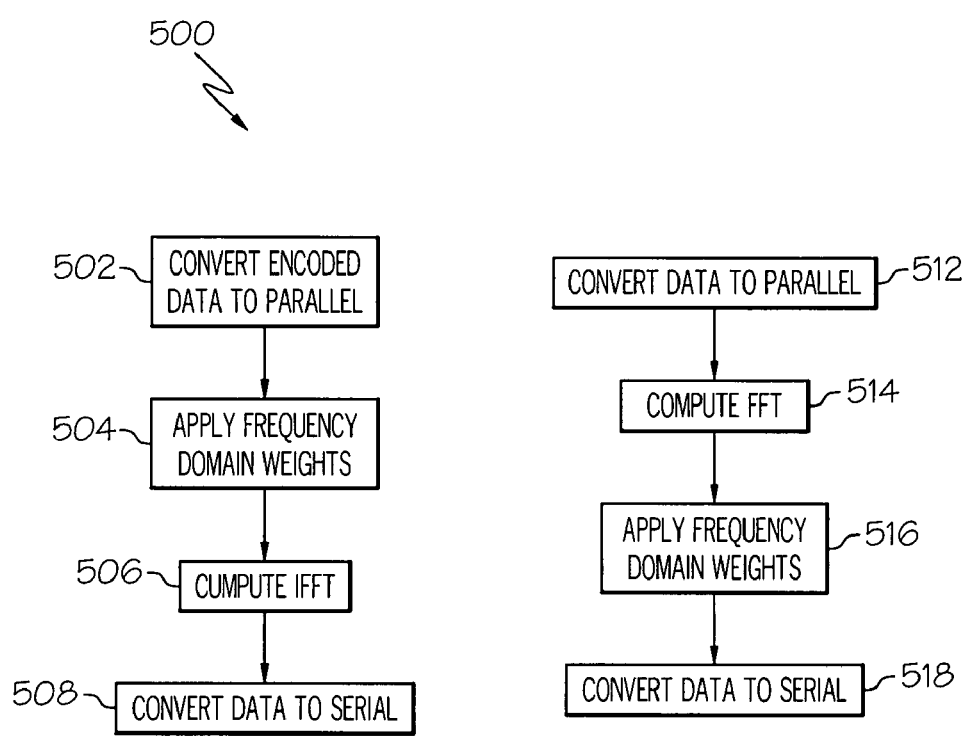
FIG. 5 depicts a flow chart of an embodiment for applying Frequency Domain Weights for RFI mitigation.

FIG. 5 shows a flow chart of an embodiment 500 for applying Frequency Domain Weights to received and transmitted signals in the WAP. In the transmitter side of the transceiver of the WAP, the encoded digital data is converted from a serial bit stream to parallel (element 502). Then the Frequency Domain Weights are applied to the parallel data to compensate for RFI of the platform (element 504). An Inverse Fast Fourier Transform (IFFT) is performed on the data to convert the data to the time domain (element 506). Then the data is converted to serial form (element 508).

In the receiver side of the WAP, demodulated received data is converted from serial to parallel (element 512). A Fast Fourier Transform (FFT) is performed on the data to convert to the frequency domain (element 514). Then, the Frequency Domain Weights are applied to the Fourier-transformed data to compensate for RFI of the platform (element 516). This weighted data is then converted to serial form (element 518).

Thus, some embodiments comprise a method for compensating for Radio Frequency Interference (RFI) of a platform. The method comprises determining RFI information of the platform and deriving a set of Frequency Domain Weights from the RFI information. The Frequency Domain Weights are applied to a signal in a transceiver of a wireless access point to compensate for RFI of the platform. Determining RFI information comprises listening with a receiver of the platform to the RFI of the platform. The method further comprises deriving a set of Frequency Domain Weights by performing a Fourier transform on the RFI information. The method may further comprise deriving a set of Frequency Domain Weights from the RFI information within the wireless access point.

The present invention and some of its advantages have been described in detail for some embodiments. It should be understood that various changes, substitutions and alterations can be made herein without departing from the spirit and scope of the invention as defined by the appended claims. An embodiment of the invention may achieve multiple objectives, but not every embodiment falling within the scope of the attached claims will achieve every objective. Moreover, the scope of the present application is not intended to be limited to the particular embodiments of the process, machine, manufacture, composition of matter, means, methods and steps described in the specification. One of ordinary skill in the art will readily appreciate from the disclosure of the present invention that processes, machines, manufacture, compositions of matter, means, methods, or steps, presently existing or later to be developed are equivalent to, and fall within the scope of, what is claimed. Accordingly, the appended claims are intended to include within their scope such processes, machines, manufacture, compositions of matter, means, methods, or steps.

What is claimed is:

1. A method for compensating for Radio Frequency Interference (RFI) of a platform, comprising:
   receiving, by a wireless access point, RFI information intrinsic to the platform, wherein the RFI information is stored in the platform prior to the receiving, and wherein the RFI information is determined when a transmitter of the platform is quiescent; and
   applying a set of Frequency Domain Weights (FDWs) during a conversion of parallel data of the frequency domain of an un-weighted signal to the time domain by the wireless access point, wherein the applying the set of FDWs comprises increasing signal power at frequencies corresponding to noise of the platform and decreasing signal power at frequencies corresponding to relatively lower noise of the platform to create a weighted signal, and
   wherein the un-weighted signal is to be received via an encoder of the wireless access point, and the weighted signal is to be transmitted via a transmitter of the wireless access point to the platform, and wherein the FDWs are derived via the RFI information.

2. The method of claim 1, further comprising deriving the set of FDWs by the platform.

3. The method of claim 1, further comprising deriving the set of FDWs in the wireless access point.

4. The method of claim 1, wherein applying the FDWs comprises multiplying the FDWs by the parallel data of the frequency domain of the signal.

5. The method of claim 1, further comprising applying the FDWs in a receiver of the wireless access point.

6. The method of claim 1, wherein the applying the set of FDWs during the conversion of the parallel data comprises applying the set within an Orthogonal Frequency Division Multiplexer of the wireless access point.

7. A wireless access point employing compensation for Radio Frequency Interference (RFI) of a platform, comprising:
   a receiver to receive RFI information from a transmitter of the platform, wherein the RFI information comprises information of noise intrinsic to the platform, and wherein the RFI information is stored in the platform prior to transmission to the receiver, and wherein the RFI information is determined when the transmitter of the platform is quiescent;
   a Frequency Domain Weight unit to apply Frequency Domain Weights (FDWs) to parallel data of an un-weighted signal, wherein the FDWs are derived from the RFI information, and wherein the Frequency Domain Weight unit increases signal power at frequencies corresponding to noise of the platform and decreases signal power at frequencies corresponding to relatively lower noise of the platform to create a weighted signal; and
   wherein the un-weighted signal is to be received via an encoder of the wireless access point, and the weighted signal is to be transmitted via a transmitter of the wireless access point to the platform, and wherein the FDWs are derived via the RFI information;
   a Fourier Transform unit to convert the weighted signal from the frequency domain to the time domain, wherein the weighted and converted signal is to be transmitted to the platform.

8. The access point of claim 7, further comprising a modulator to modulate a signal to which the Frequency Domain Weights and Fourier Transform have been applied.

9. The access point of claim 7, further comprising a demodulator to demodulate a received signal prior to conversion of Fourier Transformation unit and application of the FDWs.

10. The access point of claim 7, further comprising a decoder to decode a signal to which the FDWs and a Fourier Transform have been applied.

11. The access point of claim 7, wherein the FDWs are derived from RFI information received by the wireless access point.

12. The access point of claim 7, wherein the FDWs are derived from a Fourier Transform of the RFI information.

13. The method of claim 1, further comprising storing the RFI information in the platform at the time of manufacturing the platform, wherein the RFI information can be stored in a platform RFI information unit during manufacturing, initialization, or any subsequent modifications in system configuration.

14. The access point of claim 7, further comprising an encoder to encode signal information prior to application of the Frequency Domain Weights.

15. The method of claim 7, wherein the RFI information stored in the platform comprises information stored at the time of manufacture of the platform and subsequently altered due to a modification of the platform configuration.

* * * * *